A. C. ROBINSON.
TIRE AIR NOZZLE AND GAGE.
APPLICATION FILED APR. 29, 1920.
1,371,645.
Patented Mar. 15, 1921.
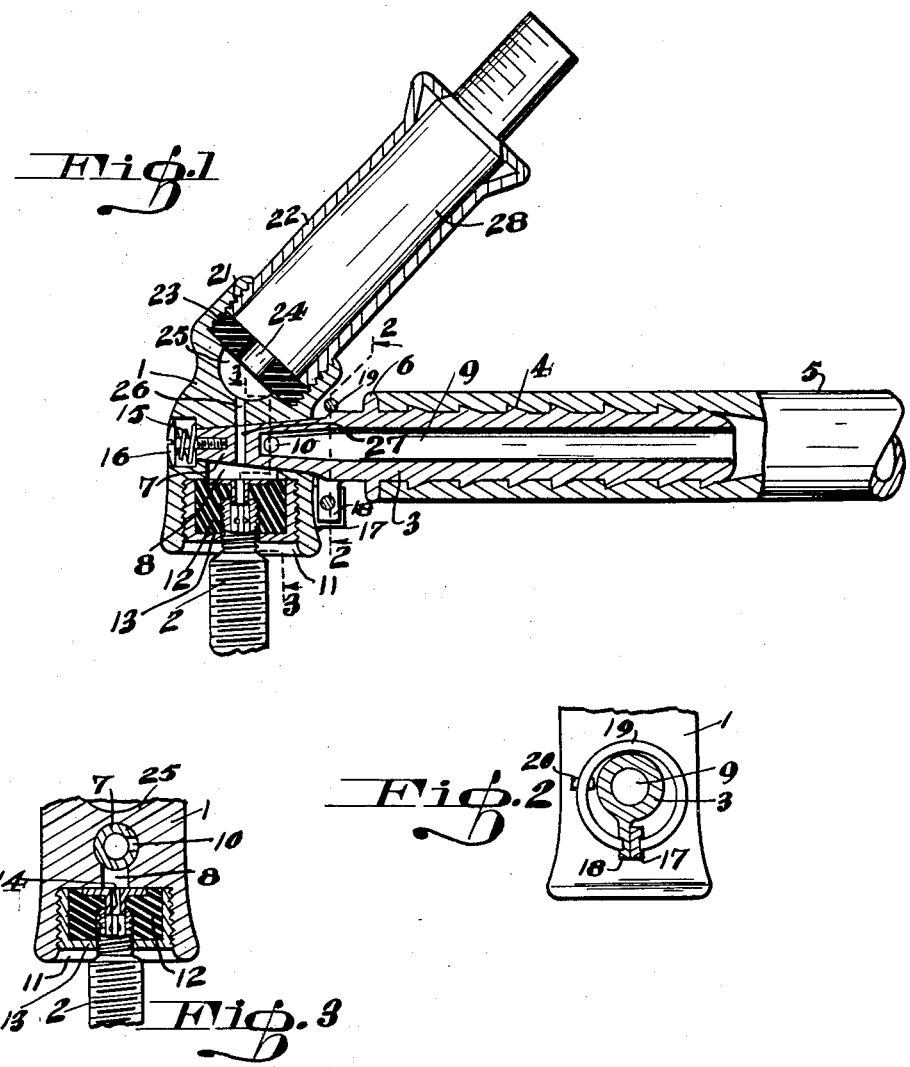
Arthur C. Robinson
INVENTOR.
BY
Hazard & Miller
ATTORNEYS

UNITED STATES PATENT OFFICE.

ARTHUR C. ROBINSON, OF LOS ANGELES, CALIFORNIA.

TIRE AIR NOZZLE AND GAGE.

1,371,645.   Specification of Letters Patent.   Patented Mar. 15, 1921.

Application filed April 29, 1920.   Serial No. 377,675.

*To all whom it may concern:*

Be it known that I, ARTHUR C. ROBINSON, a citizen of the United States, residing at Los Angeles, in the county of Los Angeles and State of California, have invented new and useful Improvements in Tire Air Nozzles and Gages, of which the following is a specification.

This invention is a combined air nozzle and gage holder particularly adapted for use upon an air pipe line for inflating pneumatic tires.

It is the object of the invention to provide a novel nozzle having associated therewith a connection for a usual or any preferred type of pressure gage.

The invention will be readily understood from the following description of the accompanying drawings in which;

Figure 1 is a longitudinal section through the combined nozzle and gage holder.

Fig. 2 is a transverse section on the line 2—2 of Fig. 1.

Fig. 3 is a vertical section on the line 3—3 of Fig. 1.

The invention is shown as comprising a body portion 1 arranged to fit down over the end of a usual valve 2, such as is employed upon a pneumatic tire, and a laterally extending pipe 3 to which the air line is connected. For this purpose the end of the pipe 3 may be notched as shown at 4 for retaining the end of a hose 5 in position over the end of the pipe 3.

The longitudinal movement of the hose on to the pipe may be limited by a flange 6 provided upon the pipe. The pipe 3 is adapted to be rotated in the body 1 of the nozzle for opening and closing the pipe to the outlet end of the body of the nozzle. For this purpose the end of pipe 3 received within the body 1 and shown at 7 is round in cross section and, preferably, tapered toward its inner end. A space 8 is provided within the body of the nozzle below the end 7 of the pipe 3, this space being closed to the conduit 9 extending through the pipe 3 when the nozzle is in closed position but arranged to communicate with said conduit when the pipe 3 is rotated to open the nozzle.

As an instance of this arrangement the conduit 9 may terminate short of the inner end of the pipe 3 and is provided with a port 10 extending laterally through the wall of the pipe 3, this port when the nozzle is closed being closed by the surrounding wall of the body of the nozzle and being open to the space 8 when the pipe 3 is rotated to open the nozzle, as clearly shown in Fig. 3. The space 8 within the body of the nozzle communicates with the open end 11 of the nozzle body, a washer 12 being, preferably, held in this open end of the nozzle as by a flanged collar 13 having threaded engagement within the end of the nozzle. An opening is provided through the center of the washer 12 adapted to receive the end of the valve of a tire, and a pin 14 is, preferably, supported in said opening in order to engage the valve stem of the valve of the tire for opening said valve when it is desired to fill the tire from the nozzle. This pin is centrally apertured to permit the passage of the air therethrough and may be provided with a flanged end by means of which it is embedded in the washer 12.

Means are provided for drawing the tapered end 7 of the pipe 3 into its tapered seat in order to provide leak proof joints, said means, preferably, comprising a coiled spring 15 abutting at its opposite ends against the body of the nozzle and against the under side of the head of a screw 16 threaded into the end of the tapered portion of the pipe. The rotatable pipe is, preferably, normally yieldably held in closed position.

For this purpose the body portion of the nozzle is provided with a lug 17 against which a lug 18 carried by the pipe 3 is arranged to abut when the pipe is in position with the nozzle closed. The parts are normally held in this position by a spring 19, shown as a metallic ring extending around the pipe 3 and having its respective ends seated in the lugs 17 and 18. When the pipe 3 is rotated against the tension of the spring 19 to open the nozzle, said rotary movement of the pipe is, preferably, limited by the lug 18 carried thereby abutting against a lug 20 upon the body portion of the nozzle.

The improved nozzle, as thus described, is adapted to support a pressure gage so that the pressure within the tire being filled will be registered upon said gage. For this purpose the end of the body portion of the gage opposite the open end 11 thereof forms a threaded recess 21 into which a metallic casing 22 is threaded, a suitable washer 23 being, preferably, provided at the inner end of this metallic casing. An opening 24 is provided in the washer 23, this opening communicating with a space 25 provided within the body 1 of the nozzle, and this space in turn communicating through a port 26 with the inner end 7 of the rotatable pipe 3.

The tapered inner end of the pipe is provided with a transversely extending port 27 arranged to communicate with the port 26 when the pipe is turned, so that the nozzle is closed and arranged to be closed against communication with the port 26 when the nozzle is open. When the ports 26 and 27 are in communication the opposite end of the port 27 is in communication with the space 8, so that when the nozzle is placed over the end of a valve of a pneumatic tire and the valve is opened the air within the tire will escape through port 27 and thence through the opening 24 in the washer 23. A usual pressure gage 28 is positioned within the metallic casing 22 with its end over the opening in the washer 23, so that the pressure of the escaping air will be registered by the pressure gage in usual manner.

When it is desired to force air from the hose 5 into a tire, the pipe 3 is rotated against the action of spring 19 so as to place port 10 in communication with the air space 8 and by forcing the end of the body portion of the nozzle down over the valve of a tire the air from the hose will be forced into the tire. When the pipe 3 is released it will be automatically reversely rotated to close port 10 and to place the gage 28 in communication with the valve of the tire through the port 27 in the rotatable pipe end. By forcing the end of the nozzle down over the valve of the tire so as to open said valve the pressure of the air within the tire will, now, be registered upon the gage 28.

Thus it will be seen that a combined nozzle and gage holder is provided by the use of which after air has been forced into a tire the pressure of said air may be quickly gaged by simply releasing the pipe 3 and allowing it to be rotated under the influence of spring 19 to nozzle closing position, in which position the air from the tire will escape to the pressure gage.

Various changes may be made without departing from the spirit of the invention as claimed:

What is claimed is:

1. A nozzle having an air outlet and a pressure gage mounted thereon, and an air inlet pipe adapted to be rotated in said nozzle to place either the air outlet in communication with the pressure gage, or the air inlet in communication with the air outlet.

2. A nozzle having an inlet pipe adapted to be rotated in said nozzle to place said pipe in communication with either end of said nozzle, one of said ends comprising an outlet end and the other of said ends being arranged to support a gage, and yieldable means for normally rotating said outlet pipe, with reference to the inlet so as to close said outlet end and open said gage supporting end.

3. A nozzle, comprising a body portion having a central chamber, an air outlet extending from said chamber, and a pressure gage mounted thereon connecting with said chamber, an air inlet member revoluby supported in said chamber and having an aperture therethrough normally connecting the air outlet with the pressure gage, an inlet port in said inlet member normally closed and adapted to be brought into communication with the central chamber by rotation of the member, the said connecting aperture between the outlet and pressure gage being positioned to close when the air inlet port is brought into such communication.

4. A nozzle, comprising a body portion having a central chamber, an air outlet extending from said chamber, and a pressure gage mounted thereon having a port communicating with the central chamber, a tubular air inlet member having a conical end revolubly supported in said chamber and having a transverse aperture extending through said conical portion and normally connecting the pressure gage port with the central chamber, and an air inlet port through the walls of said inlet member having its axis in a plane at substantially right angles to the axis of the said transverse aperture and positioned to be normally closed by the walls of the central chamber, said air inlet port adapted to be brought into communication with the central chamber by rotation of the member, said rotation interrupting the communication between the air outlet and pressure gage, and resilient means to normally hold the transverse aperture in communication with the air outlet and the pressure gage port.

In testimony whereof I have signed my name to this specification.

ARTHUR C. ROBINSON.